United States Patent
Andow et al.

(10) Patent No.: US 10,609,044 B2
(45) Date of Patent: Mar. 31, 2020

(54) ENFORCING ACCESS CONTROL IN TRIGGER-ACTION PROGRAMMING USING TAINT ANALYSIS

(71) Applicant: International Business Machines Corporation, Armonk, NY (US)

(72) Inventors: Benjamin E. Andow, Raleigh, NC (US); Suresh N. Chari, Scarsdale, NY (US); Heqing Huang, Mahwah, NJ (US); Kapil K. Singh, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 15/619,593

(22) Filed: Jun. 12, 2017

(65) Prior Publication Data

US 2018/0359266 A1    Dec. 13, 2018

(51) Int. Cl.
*H04L 29/06*  (2006.01)
*G06F 21/62*  (2013.01)
*G06F 21/16*  (2013.01)
*G06F 11/30*  (2006.01)

(52) U.S. Cl.
CPC .......... *H04L 63/1416* (2013.01); *G06F 21/16* (2013.01); *G06F 21/62* (2013.01); *G06F 21/6245* (2013.01); *H04L 63/101* (2013.01); *H04L 63/1408* (2013.01); *H04L 63/1458* (2013.01); *G06F 11/3072* (2013.01)

(58) Field of Classification Search
CPC ... H04L 63/1416; H04L 63/101; G06F 21/16; G06F 21/6245; G06F 21/62; G06F 11/3072
See application file for complete search history.

(56) References Cited

U.S. PATENT DOCUMENTS

| | | | |
|---|---|---|---|
| 8,656,370 B2 | 2/2014 | Murthy et al. | |
| 8,701,200 B2* | 4/2014 | Naldurg | G06F 21/577 |
| | | | 713/182 |
| 9,363,280 B1* | 6/2016 | Rivlin | H04L 63/1416 |
| 2010/0082513 A1 | 4/2010 | Liu | |
| 2013/0268444 A1 | 10/2013 | Namgoong et al. | |
| 2015/0372980 A1* | 12/2015 | Eyada | H04L 63/1441 |
| | | | 726/1 |
| 2016/0028764 A1 | 1/2016 | Vasseur et al. | |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Khoi V Le
(74) *Attorney, Agent, or Firm* — Law Office of Jim Boice

(57) ABSTRACT

One or more processors mark a set of data fields associated with a first trigger in a first trigger-action pair with a taint, where a trigger event triggers an action event in a trigger-action pair. One or more processors mark a first action associated with the first trigger-action pair with the taint, and detect a second trigger associated with a second trigger-action pair. One or more processors then propagate the taint from the first trigger-action pair to the second trigger, and prevent a second action associated with the second trigger-action pair in response to detecting the taint in the second trigger.

17 Claims, 8 Drawing Sheets

(56) References Cited

U.S. PATENT DOCUMENTS

2016/0042191 A1* 2/2016 Enck .................. G06F 21/6218
726/1
2016/0285914 A1* 9/2016 Singh ..................... H04L 63/20

OTHER PUBLICATIONS

N. Enck et al., "Taintdroid: An Information-Flow Tracking System for Realtime Privacy Monitoring on Smartphones", ACM, Communications of the ACM, Mar. 2014, vol. 57 No. 3, pp. 99-106.
P. Hornyack et al., "These Aren't the Droids You're Looking for: Retrofitting Android to Protect Data From Imperious Applications", CCS '11, Chicago, Illinois, USA—Oct. 17-21, 2011, Proceedings of the 18th ACM conference on Computer and communications security, pp. 639-652.

* cited by examiner

| R1_ACTION PARAMETERS | R2_TRIGGER FIELDS |
|---|---|
| SUBJECT | SUBJECT |
| MESSAGE | MESSAGE |
| <TIMESTAMP> | <TIMESTAMP> |
| <MY EMAIL ADDRESS> | <MY EMAIL ADDRESS> |

ENFORCING ACCESS CONTROL IN TRIGGER-ACTION PROGRAMMING USING TAINT ANALYSIS

BACKGROUND

The present invention relates to the field of computers, and particularly computers that use trigger-action programming. More particularly, the present invention relates to controlling runtime access in trigger-action programming environments.

SUMMARY

In a computer-implemented method embodiment of the present invention, one or more processors mark a set of data fields associated with a first trigger in a first trigger-action pair with a taint, where a trigger event triggers an action event in a trigger-action pair. One or more processors mark a first action associated with the first trigger-action pair with the taint, and detect a second trigger associated with a second trigger-action pair. One or more processors then propagate the taint from the first trigger-action pair to the second trigger, and prevent a second action associated with the second trigger-action pair in response to detecting the taint in the second trigger.

Other embodiments of the present invention include a computer system and a computer program product.

DETAILED DESCRIPTION

Figure 1:
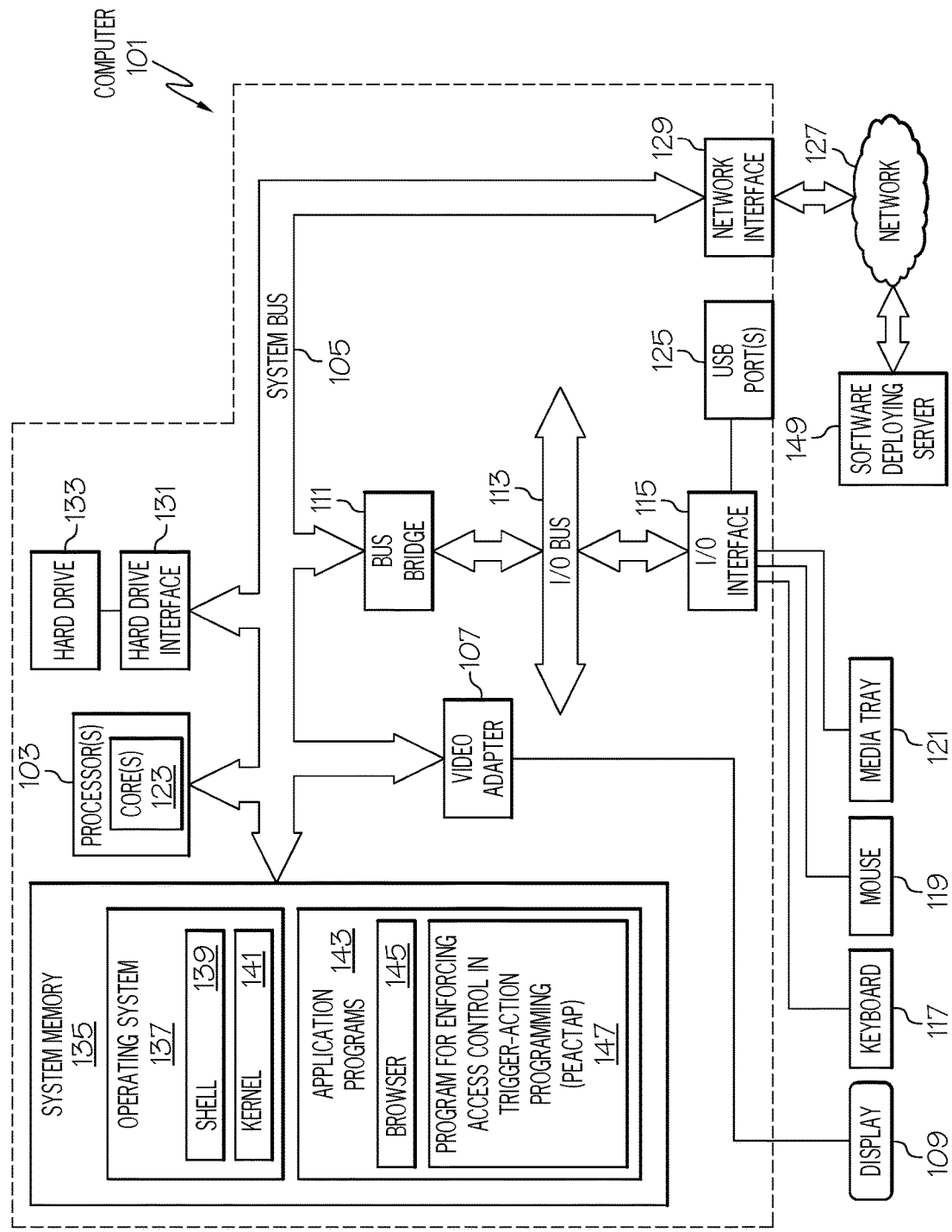
FIG. 1 depicts an exemplary system and network in accordance with one or more embodiments of the present invention.

With reference now to the figures, and in particular to FIG. 1, a block diagram of an exemplary system and network in accordance with one or more embodiments of the present invention is depicted. Some or all of the exemplary architecture, including both depicted hardware and software, shown for and within computer 101 can be utilized by software deploying server 149 shown in FIG. 1, and/or system 301 and/or device controller 317 shown in FIG. 3.

With further reference to FIG. 1, exemplary computer 101 includes processor(s) 103, operably coupled to a system bus 105. Processor(s) 103 may embody or use one or more processor core(s) 123. A video adapter 107, which drives/supports a display 109, is also coupled to system bus 105.

System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or remote video reviewing computers 151 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 includes a wireless network, such as a Wi-Fi network, and a cellular network. An example embodiment of the present invention utilizing a network "cloud" environment will be discussed with reference to FIG. 7 and FIG. 8.

Referring again to FIG. 1, a hard drive interface 131 is also coupled to system bus 105. Hard drive interface 131 interfaces with a hard drive 133. In one embodiment, hard drive 133 is a non-volatile memory storage and populates a system memory 135 (e.g., random access memory (RAM)), which is also coupled to system bus 105. System memory may be considered a lowest level of volatile memory in computer 101. System memory 135 may include additional, higher levels of volatile memory (not shown), including, but not limited to, cache memory, registers and buffers. Data that populates system memory 135 includes operating system (OS) 137 and application programs 143 used by computer 101.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions (not depicted) enabling a World Wide Web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 stored in the system memory 135 system memory of computer 101 include Program for Enforcing Access Control in Trigger-Action Programming (PEACTAP) 147. In some embodiments, system memory 135 can be shared and/or application programs 143 distributed across one or more software deploying servers 149 or other systems (not depicted). In the example depicted, PEACTAP 147 includes program instructions (software) adapted for implementing processes and/or functions in accordance with the present invention, such as (without limitation) those described with reference to FIGS. 2-6. In some embodiments, PEACTAP 147 is downloaded from software deploying server 149, (on-demand or "just-in-time") e.g., where the PPSM 147 software is not downloaded until needed for execution. In some embodiments of the present invention, software deploying server 149 can perform all (or many) of the functions associated with the present invention (including execution of PEACTAP 147), thus freeing computer 101 from having to use its internal computing resources.

The hardware elements depicted in computer 101 are not intended to be exhaustive, but rather are representative to highlight essential components required by the present invention. For instance, computer 101 may include alternate memory storage devices such as flash memory, magnetic cassettes, digital versatile disks (DVDs), Bernoulli cartridges, and the like. These and other variations are intended to be within the spirit and scope of the present invention.

Trigger-action programming is an event-driven programming paradigm in which a system specifies an event of the system's behavior as a trigger and the resulting action that should occur whenever that event is triggered. Triggers reflect the occurrence of specific events in the system, such as an alert when an email is received, when the lights are turned on, or when the door is unlocked. When a trigger is activated, the notification contains data represented as fields, which contain associated data of the event that occurred within the system. For example, if the trigger is "when an email is received", the fields returned with the trigger may be data such as the email's sender, title, date, message, and attachments.

Actions are the operations that the system is allowed to perform, such as sending an email, turning on the lights, and unlocking the door.

Both triggers and actions can be parameterized. For example, a trigger can contain a parameter to only provide a notification when an email is received from a specific email address (e.g., when Alice sends me an email), or to turn on a light only when a motion sensor is activated, or to unlock a door only when an authorization signal is received from a user's smart phone.

A single trigger-action rule is typically referred to as a recipe. For example, a recipe can be defined to execute the following: "If I received an email from Alice, then turn on the wirelessly-controlled variably-hued light emitting diode (LED) lights in location X", where receiving an email from Alice is the trigger, and turning on the wirelessly-controlled variably-hued light emitting diode (LED) lights in location X is the resulting action.

Web-based services for trigger-action programming, such as IFTTT ("If This Then That"), are offered to allow users to create and deploy recipes, and automate their workflows with other popular web-services (e.g., social media services, email, etc.), and Internet of Things (IoT) devices (e.g., smart locks, lights, cars, etc.).

Web-based trigger-action programming services, such as those that utilize IFTTT logic, allow users to post recipes on a public marketplace in order to allow other users to add those recipes to their own user profile, thus helping automate certain IoT services or web applications.

However, a problem arises in trigger-action programming/services when actions invoked by the trigger-action programming cause a trigger to occur. That is, an action (caused by a first trigger) can cause a system behavior to occur (i.e., a second trigger), which sends a notification of the event back to a system or service (e.g., a web-service). For example, the first action "sending an email" could cause the invocation of a second trigger "when I receive an email". This property can result in the construction of cascading chains of trigger-action programming recipes, which may lead to unexpected consequences, such as allowing an unauthorized party to unlock a door simply by sending an email.

For example, a cascading recipe chain could be the following two recipes; (1) "If I am tagged on a social media website (first trigger), send me an email (first action)"; (2) "If I receive an email (second trigger), unlock my doors (second action)". In this case, being tagged on the social media website would create a cascading trigger-action chain, thus resulting in unlocking the user's doors.

Such a condition/problem is due to the lack of access control enforcement in trigger-action programming environments. Moreover, the users are allowed to publish their recipes, which are then used by others. The lack of access control in trigger-action programming and the lack of vetting (i.e., screening for authorization) in the process of recipe creation and publishing allows two main types of attacks to occur: (1) Privilege escalation; and (2) Denial of service.

Privilege escalation occurs when a low-risk recipe causes the execution of a high-risk task, such as the cascading recipe chain example described above.

Denial of service occurs when two or more recipes added to the user's profile form a resource usage loop and continuously trigger those sets of recipes. For example, the following two recipes could lead to a denial of service attack: (1) "If I post a short message service (SMS) message on a first social media platform with topic identifier # DOS, then post the SMS message on a second social media platform"; (2) "If I post a status on the second social media platform with # DOS, then post the status on the first social media platform". In this example, when either the SMS message is posted or the status is posted with # DOS, then the recipes will continuously repost the message due to the loop in the recipe chain.

Thus, the present invention presents a new and novel taint analysis to enforce runtime access control in trigger-action programming environments, which can be applied to prevent the privilege escalation and denial of service attacks discussed above.

Taint analysis is a form of information flow analysis that is used to monitor how information flows throughout a system. Whenever a variable that can be modified by a (authorized or unauthorized) third party is identified, that variable is deemed to be a potential security risk. Identification of such variables may be performed by evaluating each variable in trigger-action recipes. That is, if a variable is identified that 1) can be modified by a third party and/or 2) can influence another trigger-action recipe, then it is deemed to be "tainted".

Thus, a "taint" is defined as a tag for a variable or data that has been identified as being susceptible to illicit attack and/or can cascade in an improper manner from a first recipe to a second recipe.

For example and with regard to illicit attacks, a program may have an attack surface, which are places in which the program can be accessed by an outside party. This attack surface thus gives a third party a pathway to reach (and thus modify) variables, files, file metadata and data within the program, and to reach (and thus manipulate) resources such as clocks, busses, etc. that are accessible from and/or used by the program.

With regard to cascading in an illegal manner, this occurs when an action in a first recipe causes a trigger in a second recipe to fire, as described and depicted below in FIG. 2.

In one approach used to handle tainted variables, a service uses a graph reachability problem that constructs a graph from the recipes and performs a reachability analysis on the graph to identify chains. Therefore, when the user attempts to install a new recipe, the service performs this reachability analysis and prevents new recipes (that violate the access control policies defined by the service) from being installed.

Although install-time access control may solve the problem just described, it is detrimental to usability. For example, the chain may only cascade under certain circumstances (e.g., parameter has a certain string), so install-time access control is too coarse grained. The present invention overcomes this issue.

Similarly, a simple runtime access control mechanism may be achieved by constructing the chain from the graph's reachability analysis and blocking the next execution of the action that violates access control (or the next execution in a certain timespan). However, this is also detrimental to usability and is less secure. For example, before the chain begins cascading, assume that the user issues a command that triggers the same recipe that needs to be blocked in the chain. In this case, usability is diminished since the process allows the malicious chain to continue its payload.

Thus, presented herein is a process that uses taint analysis to enforce runtime access control in trigger-action programming environments, which can be applied to prevent the privilege escalation and denial of service attacks in trigger-action programming deployments discussed above. In one or more embodiments of the present invention, the data sources are the following: (1) the data fields of the triggers; (2) the parameters of the actions. Therefore and in various embodiments of the present invention, the data fields of trigger T have the taint $T_{TAINT}$, and the parameters of an action A will have the taint $A_{TAINT}$. The data sinks are the recipe's actions.

In one or more embodiments of the present invention, propagation rules consist of two main rules:

(1) $B_{TAINT} \Leftarrow A_{TAINT}$ for the rule "if trigger A occurs, then execute action B"

(2) $C_{TAINT} \Leftarrow B_{TAINT}$ for the rule "if action B occurs, then execute trigger C."

When a trigger is fired, the present invention taints the trigger's fields and parameters with the trigger's identifier. When the trigger invokes an action, the taint associated with the action becomes the taint that is associated with the trigger, as discussed in the propagation rules discussed above. When an action is set to occur, but before execution, the system checks whether the taint tag of the trigger that causes that specific action to occur contains any identifier that would result in an access control denial.

Thus, a denial of service (DoS) attack can be prevented by disallowing actions whose taint tag contains their own identifier, as this would necessitate a loop. As such, the present invention uses taint tracking to resolve the originating triggers that influence the execution of an action, since recipes oftentimes cannot propagate tags across services.

In one or more embodiments, the present invention is designed as an analysis engine deployed on a trigger-action programming web-service server to allow for the enforcement of access control policies. This allows taint tracking to maintain provenance information when a trigger is fired, in order to be able to enforce access control policies. However, one main challenge is resolving whether the instance of the trigger has provenance information associated with it, which arises with the middle and end-links of the trigger-action cascading chain.

For example, consider the following recipes R1 and R2:
R1: If User X is tagged in photo on a social media website (R1_TRIGGER)-->Send User X an email (R1_ACTION)
R2: If User X receives an email with the subject # Unlock (R2_TRIGGER)-->Unlock User X's door (R2_ACTION)

In this example, User X's combined recipes inadvertently cause his home to become vulnerable if a friend or family member happens to tag a photo on social media with the hashtag "# Unlock". This vulnerability may be further exploited by a third party with malicious intent, who only needs to tag User X in a photo (whether or not User X is actually related to the photo in any way) to cause a chain reaction that unlocks User X's door.

Assume that User X wants to disallow the action "If User X is tagged in photo on a social media website" (R1_TRIGGER) from affecting the door lock. In this case, consider that when R1_TRIGGER occurs, this will cause R1_ACTION to execute, as respectively shown in block 202 and block 204 shown on the timeline 200 in FIG. 2. However, as depicted by dashed line arrow 206, when R1_ACTION executes (by sending an email), R2_TRIGGER (shown in block 208) may occur (by receiving the email, which may have the subject # Unlock), and in turn R2_ACTION (shown in block 210) will occur. For reasons described above (i.e., to avoid cascading recipes, etc.), there is a need to block the execution of R2 ACTION shown in block 208.

However, a user may still want to execute recipe R2. That is, assume that the R2_TRIGGER shown in block 212 is intentionally executed by the user. In this case, the user wants the R2_ACTION shown in block 214 to be executed, while still intending that the R2_ACTION shown in block 210 is blocked from executing (via the link shown by arrow 206 between block 204 and block 208).

In order to alleviate the issue of unwanted activation of triggers/actions, one or more embodiments of the present invention propagate taint tags from an action in a first recipe to a trigger in a second recipe.

In accordance with one or more embodiments of the present invention, each trigger in a recipe contains parameters and fields, and each action in a recipe contains parameters. For example, the trigger "if I receive an email from Alice" has the parameter Alice's email, as well as fields such as the sender's email address, the current date, the subject of the email, the message itself, etc. Further, the action of "sending another email" has the parameters of the recipient email address, the subject of the other email, the message in the other email, attachments to the other email, etc. By linking the action's parameters to the trigger's fields, then the present invention propagates the taint tags by: 1) predicting a trigger in a second recipe that will be executed based on the parameters of an action in a first recipe; 2) inserting taint tags associated with the parameters of the action in the first recipe into a taintMap (i.e., a mapping of a taint associated with the parameters of the action in the first recipe to a field in the trigger in a second recipe); and 3) updating the taint tags on the trigger in the second recipe when that trigger executes by looking up that trigger's fields.

The architecture used by one or more embodiments of the present invention consists of four main data structures: 1) a taint map; 2) a recipe list; 3) a global action-trigger map; and 4) an access control list.

Figure 3:
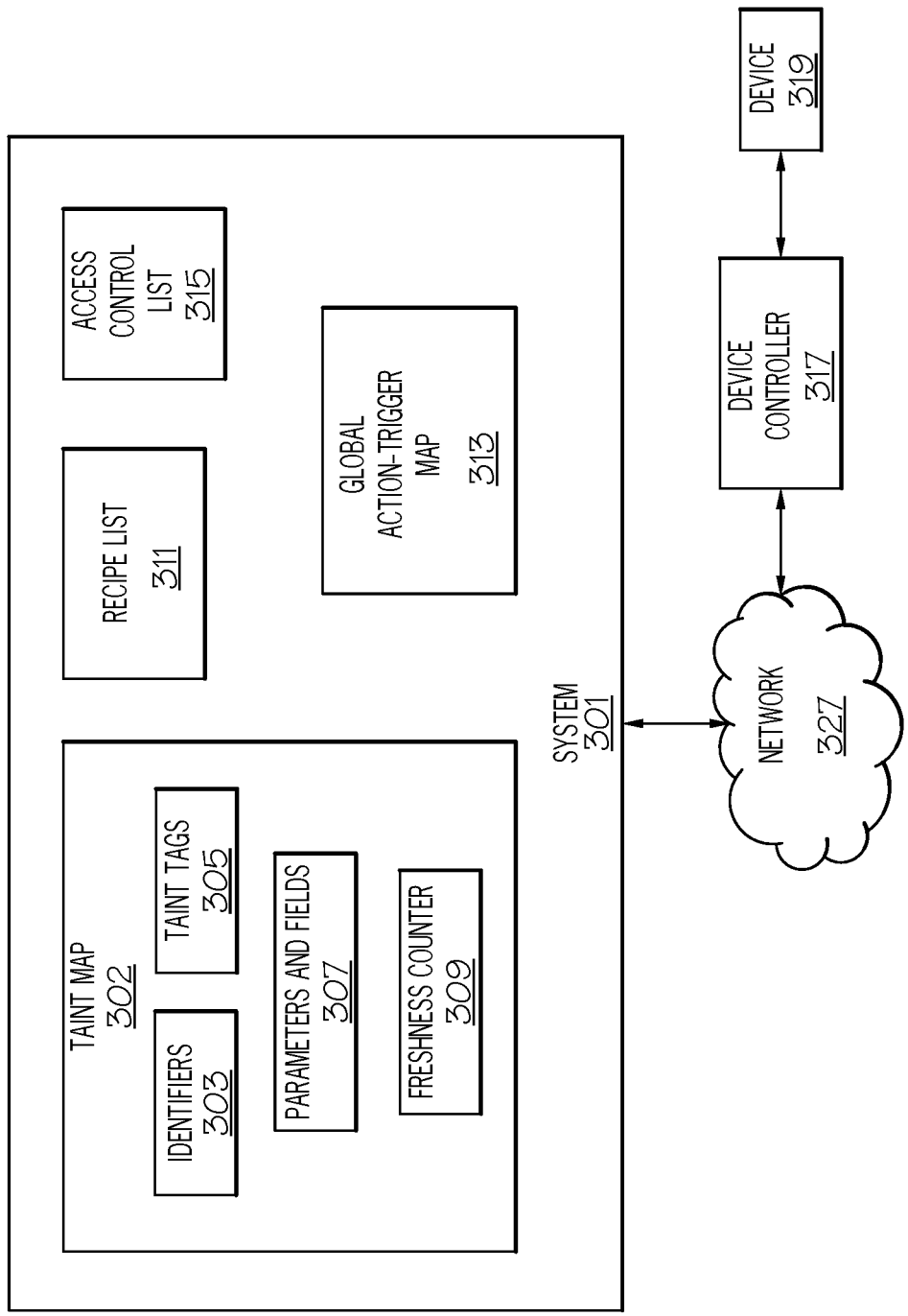
FIG. 3 depicts additional detail of a system used as a security module and/or controller system in accordance with one or more embodiments of the present invention.

For example, as shown in FIG. 3 a taint map 302 within a system 301 (analogous to computer 101 shown in FIG. 1) records identifiers 303 to a trigger/action that was previously executed, the associated taint tags 305, the trigger/action's parameters and fields 307, and a freshness counter 309 (which denotes how recipes are expected to be invoked when an action occurs).

The recipe list 311 maintains all of the user's current recipes.

The global action-trigger map 313 contains mappings of actions that cause triggers to fire and the corresponding parameter and field mappings between actions and triggers.

The access control list 315 maintains the user's policies for when a taint tag can be propagated.

Figure 4:
FIG. 4 illustrates a table of associated action parameters and trigger fields in accordance with one or more embodiments of the present invention.

For example, the parameters and fields for R1_ACTION and R2_TRIGGER are listed in table 400 shown in FIG. 4. Each parameter/field shown in a row in table 400 is linked. That is, the action parameter "subject" is linked to the trigger field "subject"; the action parameter "message" is linked to the trigger field "message"; the action parameter "<Timestamp>" is linked to the trigger field "Date received"; and the action parameter "<My email address>" is linked to the trigger field "Sender email address". As such, the taint for each action parameter is linked to its associated trigger field.

If the system executes the send email action shown above in R1, it can determine that R2 is expected to fire as a consequence. Based on the action's parameters and trigger's fields described above and the link (e.g., shown as arrow 206 in FIG. 2) between them, the system also will predict the fields expected in R2's trigger (shown in block 208 in FIG. 2).

For example, assume that R1_ACTION is invoked with the following parameters:
(subject=# unlock, message="hello world", attachment=None, timestamp=X, my email address=abc.com),
then the R2_TRIGGER will have the corresponding fields:
(subject=# unlock, message="hello world", attachment=None, timestamp=X, my email address=abc.com).

Therefore, the system will insert R1's triggers' taint tags 305 into the taint map 302 shown in FIG. 3. Thereafter, when R2's trigger fires, the system will search to check if there is a tainted trigger (e.g., R1_TRIGGER) in the taint map 302 that matches the current trigger (e.g., R2_TRIGGER) based on the values of the fields (e.g., subject, message, attachment, date received, sender's email address) in the taint map 302, and retrieve the taint tag (e.g., R1_TRIGGER$_{TAINT}$).

Thereafter, as the system is deciding whether or not to invoke the unlock door action in R2 (e.g., R1_ACTION), the system can check to see if the taint tags in the recipe contain any access control violations based on the action that is about to execute.

For example, assume that the system 301 shown in FIG. 3 is tasked with controlling a device 319, which is controlled by a device controller 317 (which may be a processing system having a similar architecture as the computer 101 shown in FIG. 1), which communicates either directly (via a "hard wired connection") or remotely (via network 327, which is analogous to the network 127 shown in FIG. 1). In this embodiment, system 301 will first check to see if any of the taint tags 305 are located within the recipe (e.g., a trigger-action pair such as if "User X receives an email with the subject # Unlock" (R2_TRIGGER), then "Unlock device 319" (R2_ACTION)). Thus in this example, the system 301 will block execution of the R2_TRIGGER since it contains the taint tag from taint tags 305 that is associated with (i.e., is found in) R1_TRIGGER ("User X is tagged in photo on a social media website"). Thus, since User X is tagged in a photo on a social media website, this tainted condition violates a policy that does not allow tagging photos on social media websites to affect unlocking the door (i.e., device 319).

As discussed above, if a user sends a separate email before R2 is executed, the device 319 can be unlocked, since this is in a different recipe stream, assuming that the tainted parameters in this separate email trigger-action pair recipe do not match (e.g., they do not hold the same subject, message, attachment, date, sender email address, etc. that is tainted by the taint tags 305).

In one or more embodiments of the present invention, a procedure to enforce access control in trigger-action programming is as follows.

First, when a trigger is fired, the security module (e.g., system 301 shown in FIG. 3) resolves the recipe that is going to be called, and checks if the trigger is already contained in the taint map 302. To check if the trigger is located in the taint map 302, the security module leverages the trigger's identity and fields to search the taint map 302. If a match is found, then the security module taints the trigger with the previous taint tag found in taint tags 305, and then taints the action that will be invoked by the trigger with the previous taint tag and the trigger's identity.

As shown in FIG. 3, the taint map 302 also contains the freshness counter 309, which denotes how recipes are expected to be invoked when an action occurs (i.e., due to the chaining effect). If the trigger of a recipe is not located in the taint map 302, and the recipe's action can lead to cascading chaining recipes, the freshness counter 309 is the number of recipes that will be potentially affected by the action. This is a conservative estimation of how many recipes could be automatically triggered by the executed actions. In one or more embodiments of the present invention, system 301 (i.e., the security module) sets a timer (e.g., 30 minutes) for each triggers' taint tags in the taint map. Thus, whenever the timer expires or the freshness counter is reduced to 0, the tainted entry will be removed from the taint map 302.

For example, assume that recipe R1 executes. System 301 then looks up the user's recipes (as identified by identifiers 303 shown in FIG. 3) that will be affected by the execution of R1, and inserts the following entry into the taint map 302:
(R2_TRIGGER, subject=# unlock, message="hello world", attachment=None, timestamp=X, my email address=abc.com, freshness=1, TAINT="SOCIAL MEDIA_TAG_BY_FRIEND")

Assume that R1_ACTION causes the automatic execution of R2_TRIGGER. Therefore, R2_TRIGGER fires with the following information:
(subject=# unlock, message="hello world", attachment=None, timestamp=X, my email address=abc.com)

The system 301 searches the taint map 302 with the identity R2_TRIGGER and the fields above, and finds a match in the taint map 302. When system 301 finds a match in the taint map 302, it decrements the freshness counter 309 by 1. As discussed above, when the freshness counter 309 reaches zero, system 301 removes the entry R2_TRIGGER from the taint map 302.

Assuming that the freshness counter 309 has not reached zero, and that R2_TRIGGER contains the taint tag {SOCIAL MEDIA_TAG_BY_FRIEND}. Since the system 301 knows from the recipe that R2_TRIGGER leads to R2_ACTION, it propagates the taint to R2_ACTION and adds R2_TRIGGER to the tag. Thus, R2_ACTION's taint tag is {SOCIAL MEDIA_TAG_BY_FRIEND, EMAIL_RECEIVE_MESSAGE}.

Before the system 301 executes the R2_ACTION, it checks the access control policy (found in the access control list 315) and finds that "Tagged in a photo on Social Media" should not be allowed to unlock the door (e.g., device 319). Therefore, the system 301 checks the taint tag for R2_ACTION for the taint tag SOCIAL MEDIA_TAG_BY_FRIEND, and denies R2_ACTION from executing.

Figure 2:
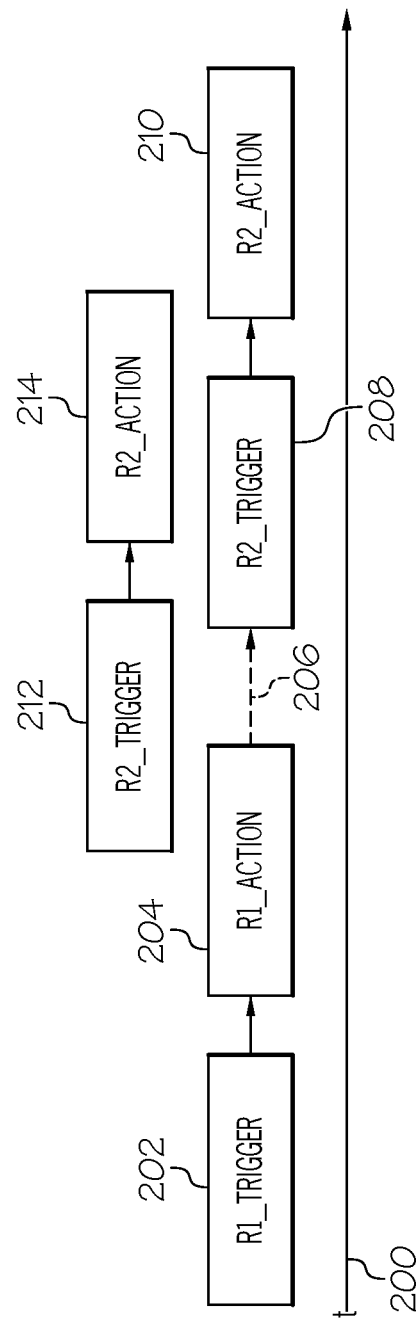
FIG. 2 illustrates two exemplary sets of trigger-action recipes in accordance with one or more embodiments of the present invention.

As demonstrated in FIG. 2, assume that before R2_TRIGGER fires automatically in by chain (as indicated by arrow 206 and block 208), the user sends herself an email (as indicated by block 212) with the following information: (subject=# unlock, message=None, attachment=None, timestamp=X, my email address=abc.com)

Assume now that the message field (None) does not match the messages field in the taint map 302, which means that system 301 will not taint this R2_TRIGGER. Therefore, R2_ACTION will be allowed to execute since its tag is simply: {EMAIL_RECEIVE_MESSAGE}.

The process described above can be used to prevent loops while still allowing a recipe to execute once. That is, the system will check that the recipe (e.g., recipe R1) does not contain its own taint tag. For example, consider the loop shown in FIG. 5:

Trigger T1 begins the loop 500, and triggers the action A1. Assume that trigger T1 can be accessed by a third party 501, and thus is tainted. Therefore, A1 contains the taint {T1}. As such, when action A1 causes trigger T2 to fire, then T2 receives the taint {T1}. Trigger T2 causes action A2 to execute, and action A2 contains the taint {T1, T2}. Finally, action A2 causes trigger T1 to fire again, and trigger T1 receives the taint {T1, T2}. Since T1's taint tag contains its own identity, the system 301 will recognize this self-taint, and will prevent the loop 500 from continuing while still allowing the first execution (from T1 to A1 to T2 to A2).

In an embodiment of the present invention, the trigger-action access control described above is used to prevent misconfigurations or attacks in IF-This-Then-That (IFTTT) services from the user end.

IFTTT is a web-based service that allows users to create chains of simple conditional statement, also called "recipes", which are triggered based on changes to other web services such as email services, social media services, etc., as well as controlling devices found in an internet of things (IoT), including turning devices off and on, etc.

Thus, in IFTTT ("IF This Then That"), triggers are the "This" part of a recipe (predicate made from Triggers and Actions). That is, "triggers" are events that trigger the "action", as described in detail above. In another example of trigger-action recipes as used by IFTTT, a system can receive a notification based on a keyword or phrase found in a rich site summary (RSS) feed that updates content to a website, etc.

Actions are the "That" part of a recipe. Actions are the output that results from the input of the trigger. For example, one recipes could be defined as "If an email is received from Alice (the trigger), then turn on the lights in a particular location (the action)".

An advantage of IFTTT services is that anyone can post recipes onto an IFTTT website, and other users can register and add the recipes into their own user profile to help automate certain IoT services or web applications. Due to the easy configurable nature of the IFTTT and the shared recipes, however, there is a need for a detection mechanism that automatically detects if there are some risks to the user when adding one or some recipes into the user's profile. For example, there is a need to prevent potentially unwanted cascading IFTTT chains that can cause privilege escalations (when a low risk task triggered, a high risk task was forced to be executed).

Thus, one or more embodiments of the present invention detect and prevent recipes that form denial of service loops, when two or more recipes added into the user's profile form a resource usage loop and keep on triggering a set of tasks in a loop.

One method performing security analysis on the recipes is to form a huge chaining graph and then do a reachability analysis on the graph to identify threats. However, such a chaining graph becomes very complicated, particularly when the "if" condition (trigger) or "then" part (action) is defined by a set of logical formula.

In order to address this problem, an embodiment of the present invention models the detection of potential misconfiguration and attacks on IFTTT services as a satisfiability (SAT) solving problem, so that the system can efficiently identify the potential cascading logic chains that can cause privilege escalation and DoS attacks among the recipes.

A SAT solving problem is a Boolean satisfiability problem. That is, assume that a Boolean expression has one or more variables. If a value of one or more of the variables can be set such that the output of the Boolean expression is "True", then that Boolean expression is satisfied.

For example, assume that the Boolean expression is:

X1 AND X2

By setting the value of either X1 or X2 to "1" ("True"), then it is possible for the output of X1 AND X2 to be "1" ("True"), and thus the expression is called "satisfiable".

However, assume now that the Boolean expression is:

(NOT X1) AND X1

It does not matter whether X1 is given a value of 1 or 0, the output of this Boolean expression will always be 0 ("False"). As such, this Boolean expression is "unsatisfiable".

Thus, this embodiment of the present invention models a recipe as a logic deduction predicate in which a conclusion is reached regarding whether or not a trigger-action process will lead to a problem (e.g., a DoS attack, a cascading system, privilege escalation, etc.).

In this embodiment, a system (e.g., system 301) sets the initial triggers and the final target actions as the facts that need to be set as true. By encoding all the recipes to be conjunctive normal form (e.g., a Boolean equation such as "T1 AND A1"), the system uses a SAT solver to identify potential privilege escalations and DoS problems in the recipe profiles by checking whether any severe privilege escalations or DoS could be satisfied based on the current recipe's initial triggers and final target actions.

Figure 5:
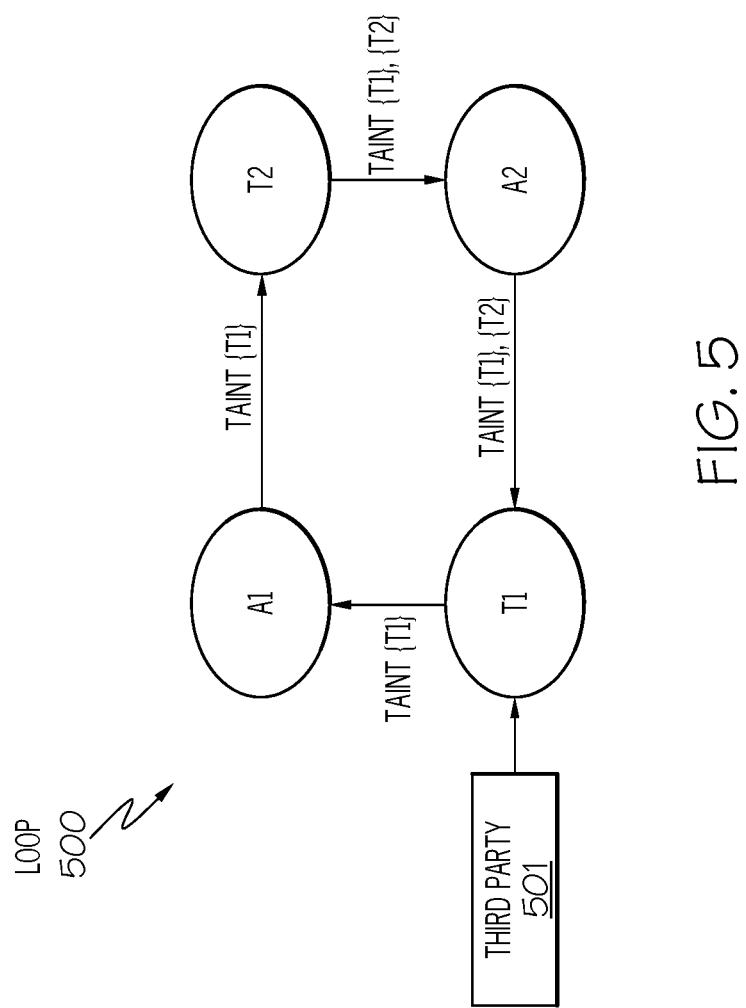
FIG. 5 depicts a trigger-action loop that is addressed by one or more embodiments of the present invention.

For example, assume that T1 and A2 shown in FIG. 5 need to be true in order to avoid an endless looping through loop 500. This requires a Boolean expression for T1, A1, T2, and A2 that describes their relationships to be able to produce the output of "true" (1) when the loop 500 returns to T1.

Thus, if this Boolean expression is constructed such that the output of any of T1, A1, T2, and A2 is false (0), then the Boolean expression is unsatisfiable since it is a conjunctive (AND) equation that requires the output from T1, A1, T2, and A2 to all be true (1).

In a preferred embodiment, the Boolean expression is based on it being "true" that there are no taints found in T1, A1, T2, and A2 that violate a certain rule (e.g., A1_ACTION causing T2_TRIGGER as described above).

This embodiment may be designed as a back-end analysis engine that can serve as a detector for end-users for the vetting purpose of the recipe configuration. Before a new set of recipes are added, the vetting process may run the SAT solving analysis (just described) and identify whether anything unwanted could be satisfied by the newly added recipes. Thus, the embodiment prevents damage to IFTTT users.

Figure 6:
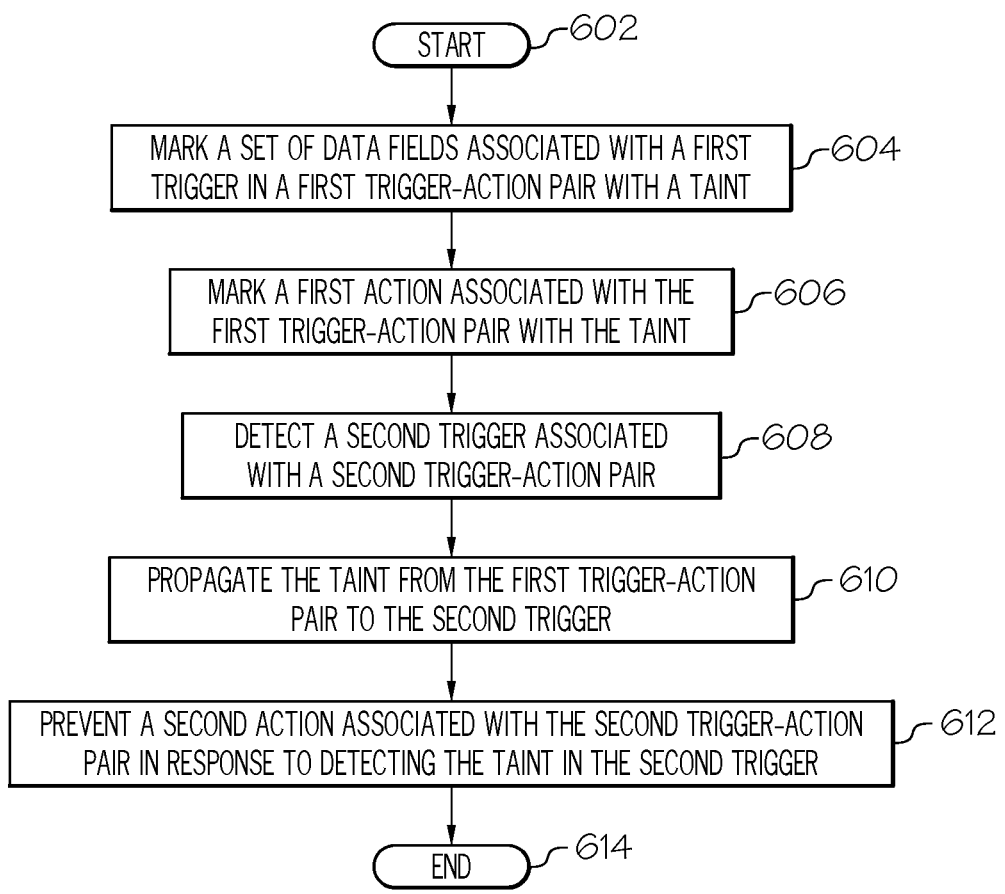
FIG. 6 depicts an exemplary method in accordance with one or more embodiments of the present invention.

With reference now to FIG. 6, a high level flow chart of one or more steps performed by one or more processors and/or other devices in accordance with one or more embodiments of the present invention is presented.

After initiator block 602, one or more processors (e.g., within system 301 shown in FIG. 3) mark a set of data fields associated with triggers (e.g., R1_TRIGGER shown in FIG. 2) in a first trigger-action pair with a taint, as described in block 604. As described herein, a trigger-action pair includes a trigger event that triggers an action event in the trigger-action pair. As discussed above, a "taint" is a tag for a variable or data that has been identified as being susceptible to illicit attack and/or can cascade in an illegal manner.

As shown in block 606, one or more processors also mark a first action (e.g., R1_ACTION shown in FIG. 2) associated with the first trigger-action pair with the taint.

As shown in block 608, one or more processors detect a second trigger (e.g., R2_TRIGGER shown in FIG. 2) associated with a second trigger-action pair.

As described in block 610, one or more processors propagate the taint from the first trigger-action pair to the second trigger. For example, if the taint is found in taint tags 305 as being associated with the first trigger-action pair (in the first trigger-action pair's trigger and/or action), and the second trigger from a second trigger-action pair is called by the first action from the first trigger-action pair, then the taint from the first trigger-action pair is applied to the second trigger in the second trigger-action pair.

As described in block 612, one or more processors then prevent a second action (e.g., R1_ACTION shown in FIG. 2) associated with the second trigger-action pair from executing in response to detecting the taint in the second trigger.

The flow chart ends at terminator block 614.

In an embodiment of the present invention, one or more processors check whether the first trigger-action pair is located in a taint map (e.g., taint map 302 shown in FIG. 3) by searching for a first trigger ID and associated data fields in the taint map. One or more processors then, in response to the first trigger-action pair being located in the taint map, decrement a freshness counter (e.g., freshness counter 309 shown in FIG. 3), where the freshness counter denotes how recipes are expected to be invoked when an action occurs due to a chaining effect from linkage between trigger-action pairs. That is, the higher the value of the freshness counter, the more likely the possibility that an action from a first recipe will trigger a trigger in a second recipe, since the higher value in the freshness counter suggests the presence of more recipes that may be affected by the first recipe.

In an embodiment of the present invention (in which the term "recipe" is used to denote a "trigger-action pair"), one or more processors detect a user input of a new recipe to the set of recipes (i.e., the user enters a new recipe to the recipe list 311) that may be utilized by the system 301 shown in FIG. 3. In response to detecting the user input of the new recipe to the set of recipes, one or more processors identify a privilege escalation, which occurs when a low risk task triggers a high risk task. In response to detecting the privilege escalation, one or more processors prevent an addition of the new recipe to a system. That is, if adding a new recipe to the recipe list increases the occurrence of a privilege escalation, then no new recipes are allowed to be added to the system 301 shown in FIG. 3.

In an embodiment of the present invention, one or more processors identify a denial of service problem in a set of recipes. In response to identifying the denial of service problem in the set of recipes, one or more processors prevent the addition of the new recipe to the set of recipes. That is, if the recipes found in the recipe list 311 enable a denial of service (DoS) event to occur, then no additional recipes are allowed to be added to the recipe list 311 for use by the system 301.

In an embodiment of the present invention, one or more processors prevent a first action associated with the first trigger-action pair in response to detecting a taint marked first action within the first trigger such that cyclic trigger actions are prevented. That is, in this embodiment any time a first action (e.g., R1_TRIGGER shown in FIG. 2) has a taint associated with it (indicating that it is susceptible to alteration by a third party and/or will trigger an R1_ACTION that may trigger another recipe), then the first action R1_ACTION is simply blocked from executing, such that it is unable to trigger the R1_TRIGGER shown in FIG. 2.

In an embodiment of the present invention and as described in detail above, one or more processors model a set of recipes composed of trigger-action pairs as a Boolean Satisfiability problem, such that each recipe is modeled as a logic deduction predicate. One or more processors set a first trigger and a final action in each recipe as true for the Boolean Satisfiability problem, and then identify a privilege escalation in the set of recipes based on the Boolean Satisfiability problem.

One or more embodiments of the present invention may be implemented in a cloud computing environment. Nonetheless, it is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
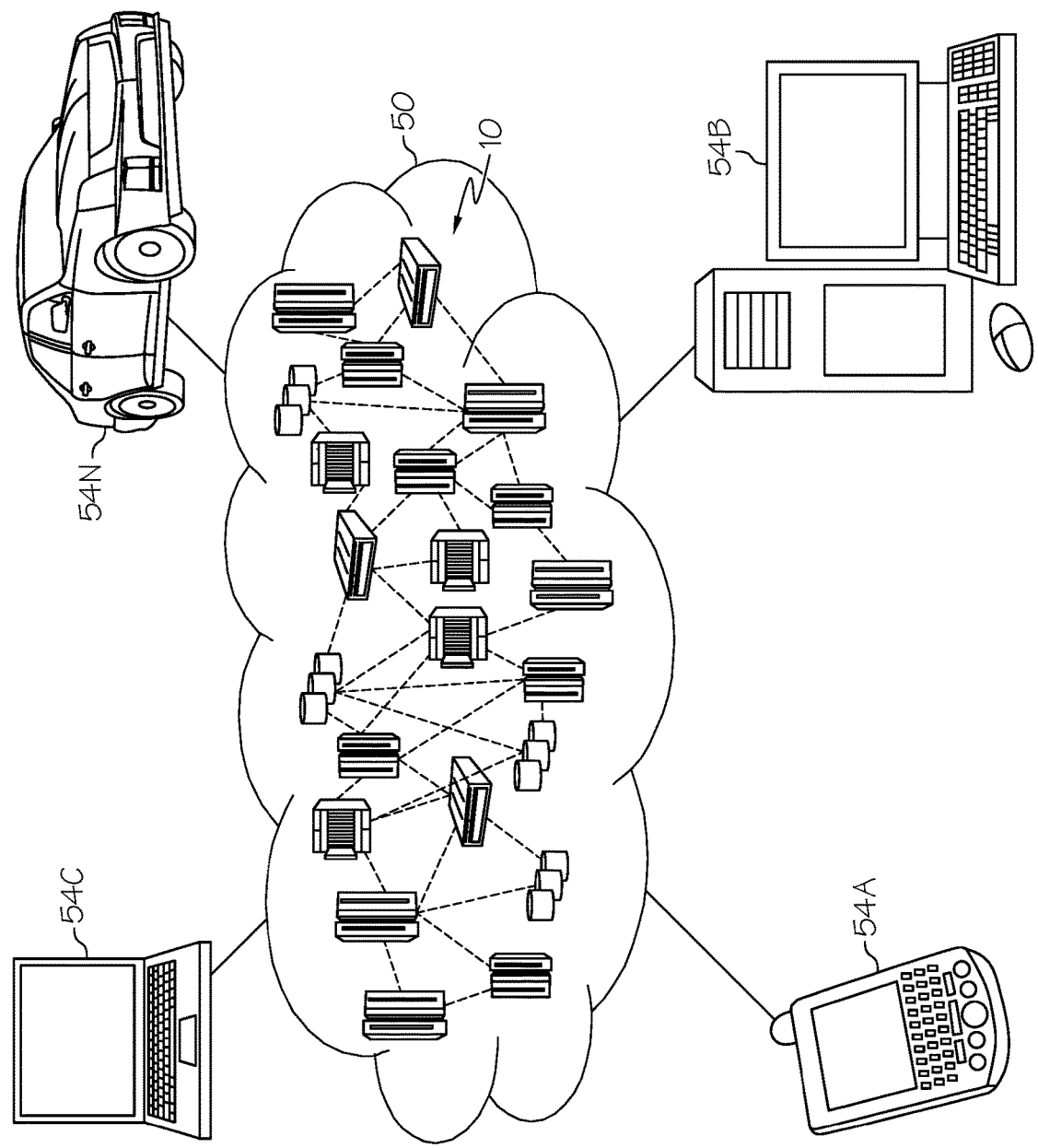
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
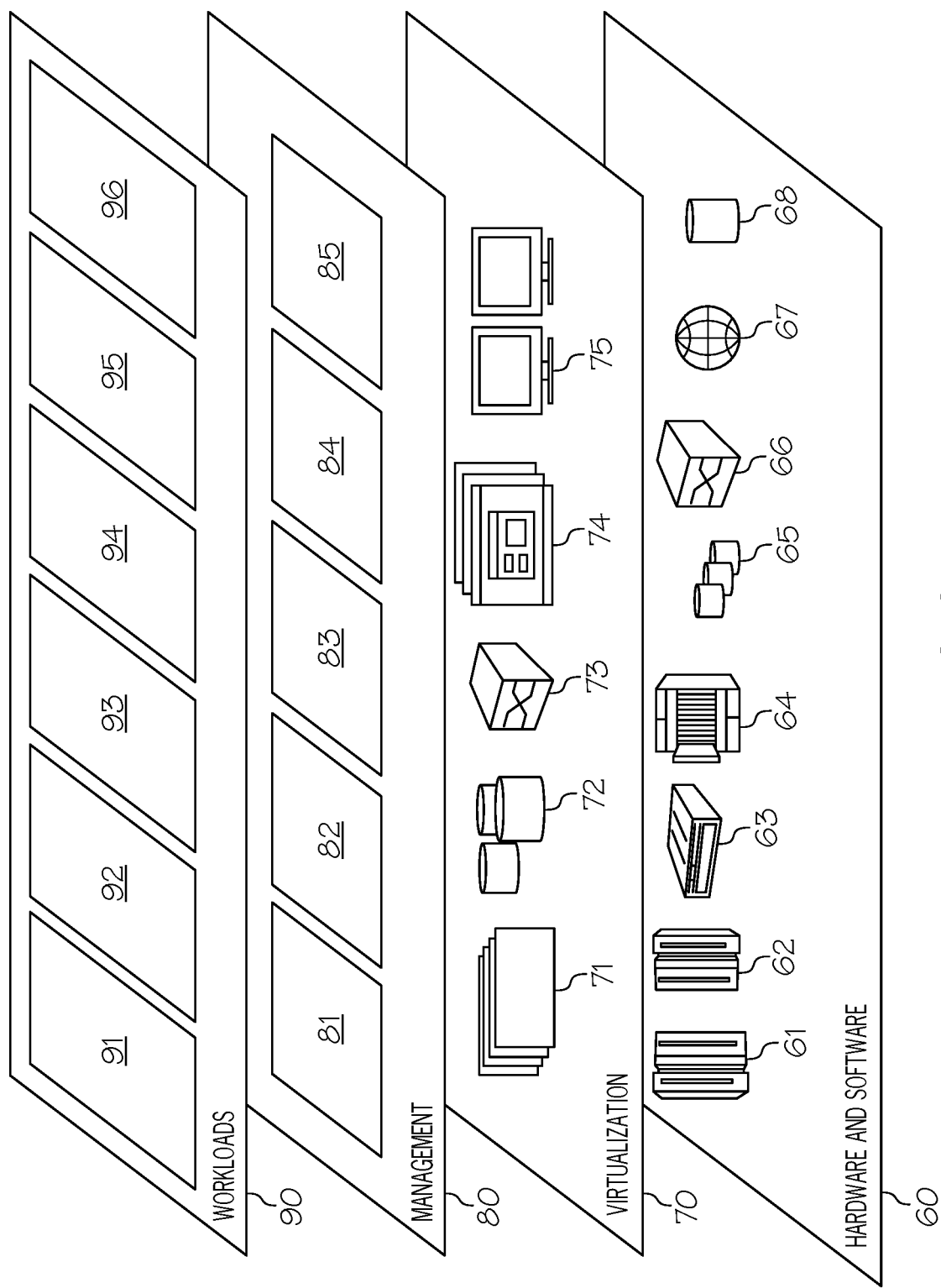
FIG. 8 depicts abstraction model layers of a cloud computing environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and trigger-programming control processing 96, which can perform one or more features of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Methods described in the present invention may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. By way of further example (only), one or more computer-implemented (e.g., in software) methods described herein may be emulated by a hardware-based VHDL program, which can then be applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
   marking, by one or more hardware processors, a set of data fields associated with a first trigger in a first trigger-action pair with a taint, wherein a trigger event triggers an action event in a trigger-action pair, and wherein the taint is a tag indicating that the first trigger has been identified as being susceptible to an illicit attack by a third party and that the first trigger is capable of influencing a second trigger-action pair;
   marking, by one or more hardware processors, a first action associated with the first trigger-action pair with the taint, wherein the first action is capable of triggering a second trigger associated with the second trigger-action pair;
   detecting, by one or more hardware processors, the second trigger associated with the second trigger-action pair;
   propagating, by one or more hardware processors, the taint from the first trigger-action pair to the second trigger;
   preventing, by one or more hardware processors, a second action associated with the second trigger-action pair in response to detecting the taint in the second trigger;
   checking, by one or more hardware processors, whether the first trigger-action pair is located in a taint map by searching for a first trigger ID and associated data fields in the taint map; and
   in response to the first trigger-action pair being located in the taint map, decrementing, by one or more hardware processors, a freshness counter, wherein the freshness counter denotes how trigger-action pairs are expected to be invoked when an action occurs due to a chaining effect from linkage between trigger-action pairs, and wherein decrementing the freshness counter indicates a decrease in a possibility of the first action triggering the second trigger.

2. The computer-implemented method of claim 1, wherein a recipe is a trigger-action pair, and wherein the computer-implemented method further comprises:
   detecting, by one or more hardware processors, a user input of a new recipe to a set of recipes;
   in response to detecting the user input of the new recipe to the set of recipes, identifying, by one or more hardware processors, a privilege escalation, wherein the privilege escalation occurs when a low risk task triggers a high risk task; and
   in response to detecting the privilege escalation, preventing, by one of more hardware processors, an addition of the new recipe to a system.

3. The computer-implemented method of claim 1, wherein a recipe is a trigger-action pair, and wherein the computer-implemented method further comprises:
   detecting, by one or more hardware processors, a user input of a new recipe to a set of recipes;
   in response to detecting the user input of the new recipe to the set of recipes, identifying, by one or more hardware processors, a denial of service problem in the set of recipes; and
   in response to identifying the denial of service problem in the set of recipes, preventing, by one or more hardware processors, the addition of a new recipe to the set of recipes.

4. The computer-implemented method of claim 1, further comprising:
   preventing, by one or more hardware processors, the taint marked first action associated with the first trigger-action pair in response to detecting the taint marked first action within the first trigger-action pair such that cyclic trigger actions are prevented.

5. The computer-implemented method of claim 1, wherein a recipe is a trigger-action pair, and wherein the computer-implemented method further comprises:
   modeling, by one or more hardware processors, a set of recipes composed of multiple trigger-action pairs as a Boolean Satisfiability problem, wherein each recipe is modeled as a logic deduction predicate;

setting, by one or more hardware processors, a first trigger and a final action in each recipe as true for the Boolean Satisfiability problem, wherein the first trigger and the final action are from different trigger-action pairs; and identifying, by one or more hardware processors, a privilege escalation in the set of recipes based on the Boolean Satisfiability problem.

6. A computer program product for enforcing access control in trigger-action programming using taint analysis, the computer program product comprising a computer readable storage device having program instructions embodied therewith, the program instructions readable and executable by a computer to cause the computer to:

mark a set of data fields associated with a first trigger in a first trigger-action pair with a taint, wherein a trigger event triggers an action event in a trigger-action pair, and wherein the taint is a tag indicating that the first trigger has been identified as being susceptible to an illicit attack by a third party and that the first trigger is capable of influencing a second trigger-action pair;

mark a first action associated with the first trigger-action pair with the taint, wherein the first action is capable of triggering a second trigger associated with the second trigger-action pair;

detect the second trigger associated with the second trigger-action pair;

propagate the taint from the first trigger-action pair to the second trigger;

prevent a second action associated with the second trigger-action pair in response to detecting the taint in the second trigger;

check whether the first trigger-action pair is located in a taint map by searching for a first trigger ID and associated data fields in the taint map; and in response to the first trigger-action pair being located in the taint map, decrement a freshness counter, wherein the freshness counter denotes how trigger-action pairs are expected to be invoked when an action occurs due to a chaining effect from linkage between trigger-action pairs.

7. The computer program product of claim 6, wherein a recipe is a trigger-action pair, and wherein the program instructions are further readable and executable by the computer to cause the computer to further:

detect a user input of a new recipe to a set of recipes;

in response to detecting the user input of the new recipe to the set of recipes, identify a privilege escalation, wherein the privilege escalation occurs when a low risk task triggers a high risk task; and in response to detecting the privilege escalation, prevent an addition of the new recipe to a system.

8. The computer program product of claim 6, wherein a recipe is a trigger-action pair, and wherein the program instructions are further readable and executable by the computer to cause the computer to further:

detect a user input of a new recipe to a set of recipes;

in response to detecting the user input of the new recipe to the set of recipes, identify a denial of service problem in the set of recipes; and responsive to identifying the denial of service problem in the set of recipes, prevent the addition of the new recipe to the set of recipes.

9. The computer program product of claim 6, wherein the program instructions are further readable and executable by the computer to cause the computer to further:

prevent the taint marked first action associated with the first trigger-action pair in response to detecting the taint marked first action within the first trigger-action pair such that cyclic trigger actions are prevented.

10. The computer program product of claim 6, wherein a recipe is a trigger-action pair, and wherein the program instructions are further readable and executable by the computer to cause the computer to further:

model a set of recipes composed of multiple trigger-action pairs as a Boolean Satisfiability problem, wherein each recipe is modeled as a logic deduction predicate;

set a first trigger and a final action in each recipe as true for the Boolean Satisfiability problem, wherein the first trigger and the final action are from different trigger-action pairs; and identify a privilege escalation in the set of recipes based on the Boolean Satisfiability problem.

11. The computer program product of claim 6, wherein the program instructions are executed as a service in a cloud environment.

12. A computer system comprising:

one or more hardware processors;

one or more computer readable memories, operably coupled to the one or more hardware processors, wherein the one or more computer readable memories store program instructions for execution by at least one of the one or more hardware processors, the stored program instructions comprising:

program instructions to mark a set of data fields associated with a first trigger in a first trigger-action pair with a taint, wherein a trigger event triggers an action event in a trigger-action pair, and wherein the taint is a tag indicating that the first trigger has been identified as being susceptible to an illicit attack by a third party and that the first trigger is capable of influencing a second trigger-action pair;

program instructions to mark a first action associated with the first trigger-action pair with the taint, wherein the first action is capable of triggering a second trigger associated with the second trigger-action pair;

program instructions to detect the second trigger associated with the second trigger-action pair;

program instructions to propagate the taint from the first trigger-action pair to the second trigger;

program instructions to prevent a second action associated with the second trigger-action pair in response to detecting the taint in the second trigger;

program instructions to check whether the first trigger-action pair is located in a taint map by searching for a first trigger ID and associated data fields in the taint map; and program instructions to, in response to the first trigger-action pair being located in the taint map, decrement a freshness counter, wherein the freshness counter denotes how trigger-action pairs are expected to be invoked when an action occurs due to a chaining effect from linkage between trigger-action pairs.

13. The computer system of claim 12, wherein a recipe is a trigger-action pair, and wherein the program system further comprises:

program instructions to detect a user input of a new recipe to a set of recipes;

program instructions to, in response to detecting the user input of the new recipe to the set of recipes, identify a privilege escalation, wherein the privilege escalation occurs when a low risk task triggers a high risk task; and program instructions to, in response to detecting the privilege escalation, prevent an addition of the new recipe to a system.

14. The computer-implemented method of claim 1, wherein the second trigger is receiving an email with a subject in a subject line of the email describing an unlocking of a physical device, wherein the second action is unlocking the physical device in response to receiving the email, and wherein the computer-implemented method further comprises:

propagating, by one or more hardware processors, the taint from the first trigger to the second trigger; and in response to the taint from the first trigger being propagated to the second trigger, blocking, by one or more hardware processors, receipt of the email, wherein blocking the receipt of the email prevents the unlocking of the physical device.

15. The computer-implemented method of claim 1, wherein the first trigger contains a first parameter and a first set of fields that describes details of the first parameter, wherein the first action contains a second parameter and a second set of fields that describes details of the second parameter, wherein the second trigger contains a third parameter and a third set of fields that describes details of the third parameter, wherein the second action contains a fourth parameter and a fourth set of fields that describes details of the fourth parameter, and wherein the computer-implemented method further comprises:

linking, by one or more hardware processors, the second parameter and the second set of fields of the first action to the third set of fields that describes the third parameter of the second trigger;

predicting, by one or more hardware processors, that the second trigger will be executed based on the linking of the second parameter and the second set of fields of the first action to the third set of fields that describes the third parameter of the second trigger;

mapping, by one or more hardware processors, the taint from the first action to the second trigger;

executing, by one or more hardware processors, the second trigger; and updating, by one or more hardware processors, taint tagging of the second trigger in response to the second trigger executing.

16. The computer-implemented method of claim 1, further comprising:

firing, by one or more hardware processors, the first trigger;

in response to the first trigger being fired, marking the first trigger with the taint;

in response to the first trigger being fired, invoking the first action; and in response to invoking the first action, marking the first action with the taint.

17. The computer system of claim 12, wherein the program instructions are executed as a service in a cloud environment.

* * * * *